Aug. 5, 1924. 1,503,989
E. McCANN
CURTAIN FASTENER
Filed Dec. 9, 1921
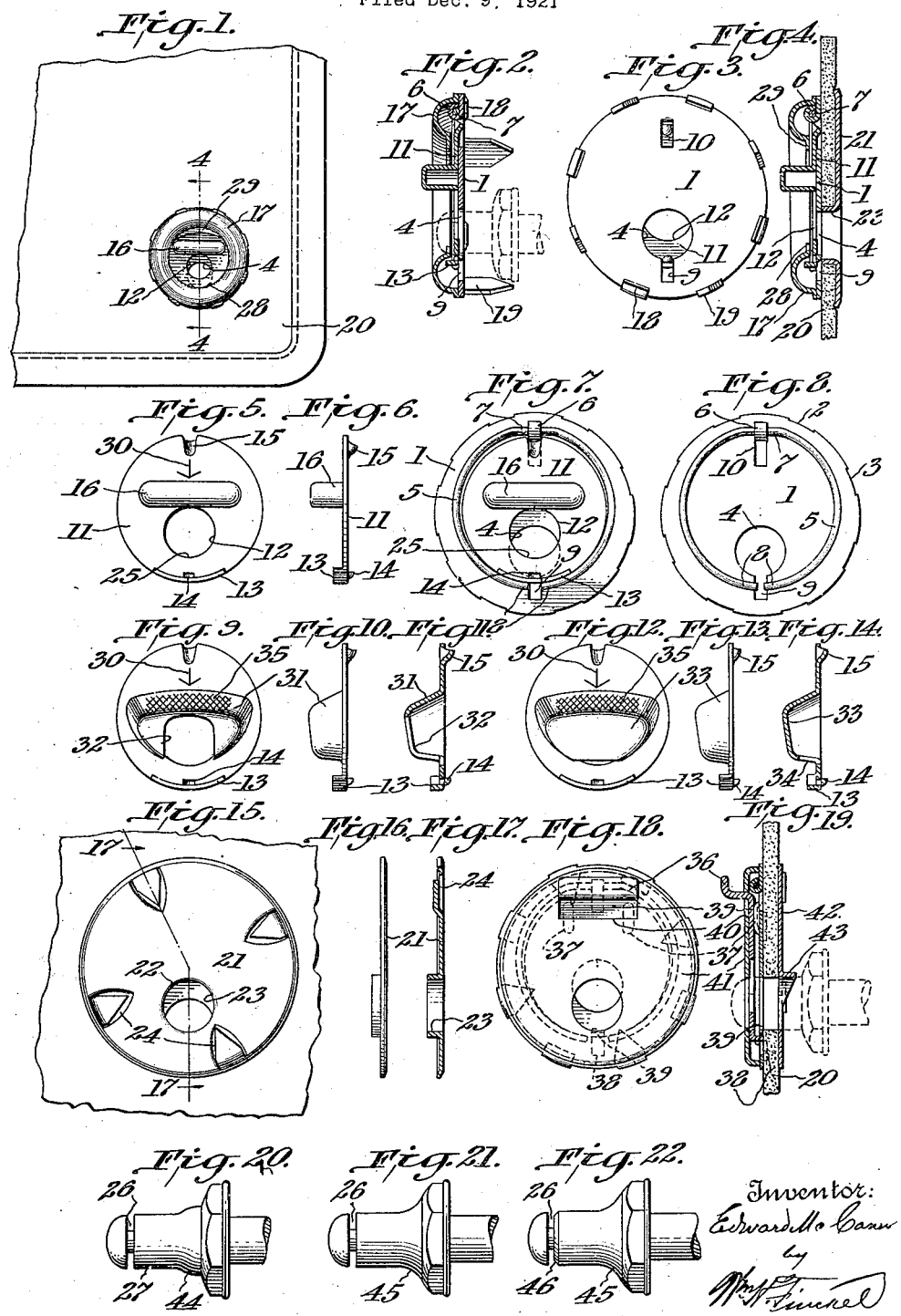

Patented Aug. 5, 1924.

1,503,989

UNITED STATES PATENT OFFICE.

EDWARD McCANN, OF CHICAGO, ILLINOIS, ASSIGNOR TO SCOVILL MANUFACTURING COMPANY, OF WATERBURY, CONNECTICUT, A CORPORATION OF CONNECTICUT.

CURTAIN FASTENER.

Application filed December 9, 1921. Serial No. 521,098.

*To all whom it may concern:*

Be it known that I, EDWARD McCANN, a citizen of the United States, residing at Chicago, in the county of Cook and State of Illinois, have invented a certain new and useful Improvement in Curtain Fasteners, of which the following is a full, clear, and exact description.

This invention relates to fasteners for the curtains of automobiles and other vehicles, and the object of the invention is to provide a fastener that while serving to effect the union of the socket and head or stud by a snap action, must be positively actuated to effect the unfastening.

In addition to certain details of construction hereinafter explained, a main feature of the invention is a slidable, spring-pressed finger or thumb-piece, in the socket, hereinafter designated the locking plate, arranged to yield to permit the union of the socket and head or stud, and manually or positively moved to disengage these parts, as I will proceed now to explain and finally claim.

In the accompanying drawings illustrating the invention, in the several figures of which like parts are similarly designated, Figure 1 is an elevation of a corner of a curtain with one form of my socket applied. Fig. 2 is a cross-section of the socket detached, showing the head or stud in dotted lines engaged therewith. Fig. 3 is an inverted plan view. Fig. 4 is a cross-section of the socket as applied, the section being taken on line 4—4 of Fig. 1. Figs. 5 and 6 are respectively a plan and edge view of the locking plate. Fig. 7 is a plan view of the spring mount or back plate and the locking plate, and Fig. 8 is a plan view of the back plate and spring alone. Figs. 9, 10 and 11 are respectively a plan view, a side elevation, and a cross-section of another form of locking plate. Figs. 12, 13 and 14 are respectively a plan view, a side elevation and a cross-section of another form of locking plate. Figs. 15, 16 and 17 are respectively an inverted view of the set socket, an edge view of the washer and a cross-section of said washer taken on line 17—17 of Fig. 15, said washer being shown in situ in Fig. 4. Fig. 18 is a top plan view and Fig. 19 is a cross-section illustrating another form of locking plate and washer. Figs. 20, 21 and 22 are elevations of as many modified forms of studs that may be used.

The present preferred construction is shown in Figs. 1 to 8. In all of the various forms illustrated in the drawings, there is a back or under plate 1, shown detached in Fig. 8, having the peripheral notches 2 and 3 to receive the aftermentioned lugs and prongs, the eccentrically arranged circular hole 4 for the entrance of the head or stud, the circular spring 5, held in place by a tongue 6 turned up out of the plate and curled over the spring, which may be straightened as at 7, or otherwise formed to locate the spring, and prevent it from turning. The ends 8 of the spring are left free so as to permit it to yield. There is a slot 9 leading out from the hole 4 and between the free ends of the spring. The turning up of the tongue 6 leaves a slot 10 in the plate.

A sliding locking member, Figs. 5 and 6, comprises a flat plate 11, having an eccentric hole 12 adapted to register with the hole 4 but normally held out of such registration by contact with the spring 5, said plate being of a diameter to fit and lie within the spring. Carried by the plate is an upward flange 13 which serves as an abutment against which the spring reacts. The plate 11 has the alined projections 14 and 15 to enter the slots 9 and 10 respectively to guide the movement of the plate 11. The plate 11 has a transversely arranged projection 16 of oblong or other shape, drawn up from or otherwise fixed to the plate, and serving as a finger or thumb-piece, or handle for imparting a sliding movement to the plate 11 to release the head or stud.

The described two parts are connected by a ring-shaped frame 17 having the lugs 18 to engage the notches 2 and closed down upon the plate 1 to unite the plates 1 and 11, and said frame also has the prongs 19 adapted to engage the notches 3 and thence pass through the curtain 20 to be clenched upon the washer 21 (Fig. 15) which is arranged upon the curtain on the inner side or side opposite to that upon which the assembled plates and frame, or socket proper, are arranged, as shown in Fig. 4. This washer has an opening 22 alined with the hole 4 in plate 1, and preferably provided with a flange 23, Fig. 4, which circumscribes the perforaton in the curtain and serves as a guide for the head or stud. As shown in Figs. 15 and 17 the washer may have countersunk recesses 24 to receive the clenched points of the prongs 19.

As shown in Fig. 7 when the socket parts are at rest, the spring automatically moves the handle member plate 11 toward the tongue 6 so that its lip 25 will overlie a segment of the hole 4 in the plate 1 and thus block the hole. The lip 25 also serves as the means for engaging the groove 26 in the tip of the head or stud 27 to unite the socket and head and thus secure the curtain.

The ring frame 17 may have the inwardly extending points 28 and the segmental lip 29 at diametrically opposite points on its inner circle to overlie the locking plate 11.

As will be understood, the locking plate partly blocks the stud holes in the socket, under the action of the spring, but it yields against pressure of the tip of the stud to admit the stud into the socket, and as soon as the stud groove 26 comes opposite the lip 25 the spring forces said lip into said groove and thereby effects the fastening of the socket and stud. But it is necessary to positively move the locking plate in the opposite direction in order to effect the release of the stud; that is to say, the unfastening of the socket and stud, and this is accomplished by pressure upon the handle 16 in the direction of the arrow 30.

The handle may be made otherwise, and three modifications will be described now. Referring to Figs. 9, 10 and 11 this handle may be made as a hood 31 rising from the plate, and cut away at 32 to accommodate the tip of the stud. As shown in Figs. 12, 13 and 14 the hood 33 has only a small frontal opening 34. These two forms may be used on separate curtains that are overlapped and secured to one and the same stud, the form shown in Figs. 9–11, having the opening 32 being used upon the under curtain and the stud projecting through so as to be engaged and concealed by the hood shown in Figs. 12–14 used on the outer curtain.

The hoods may have the checkered surfaces 35 to afford a good finger-hold in operation.

A third modification is shown in Figs. 18 and 19, and in this case the locking plate instead of having a handle such as shown in the previously described constructions, has the tongue 36 to form the handle. The under plate in this construction may be modified by pressing up the portions 37 to support the locking plate, and this plate is provided with a slot 38 which is engaged by the lug 39 turned down from the locking plate and serving to aline the plate. The tongue 36 projects out through an opening 40 in the frame 41, which in this instance is an enclosing member. The modification shown in Fig. 18 and Fig. 19 also illustrates a modification in the washer. In this instance the washer 42 instead of having an inturned flange, such as flange 23 of the washer 21, has an outturned flange or lip 43 extending only part way around and inclined. This flange or lip is designed to prevent the fastener from being tipped too far backward while it is being opened, and at the same time permits the fastener to be opened quickly.

In fasteners of the general type of fastener of the present invention, there is a tendency on the part of the washer to bind on the screw stud when the curtain is tipped back, and in order to avoid this binding, or at least to minimize its ill effects, a screw stud as shown in Fig. 20 may have applied to it a convex portion 44, or substantially the same result might be had by making this portion of the stud concave, as shown at 45 in Figs. 21 and 22. The groove 26 may have its edges parallel and square, as shown in Figs. 20 and 21, or the lower edge may be beveled as at 46 in Fig. 22.

As already stated, the fastener parts are united by a snap action, but it is necessary to positively move the locking plate in order to effect unfastening.

It is to be noticed that the handle or finger-piece in all of the various modifications herein shown and described projects outwardly from the face of the device, and thereby the handle or finger-piece is, as it were, housed, without impairing its accessibility and operation. Furthermore, this arrangement of the handle or finger-piece avoids the use of an operating member extending outwardly from the edge of the device, such extension of the operating member being quite common in the prior art patents but objectionable on account of its increasing the dimensions and bulk of the fastener and presenting a projection which may catch in opposed objects detrimentally to the fastener or to the opposed objects. By constructing the handle or finger-piece so that it stands off from the fastener normal thereto and substantially or wholly within its periphery, the fastener is not only more symmetrical than prior fasteners of the same type, but it avoids the stated and other similar objections.

Some of the advantages possessed by the invention are that spring strain is practically eliminated, because the socket is built up with a self-contained spring which is not under tension when the fastener is locked. The locking member avoids frictional contact because the length of the stud engaging element does not reach the bottom of the groove in the stud when the fastener is locked. Curtain strain is minimized, because all strain is carried against the stud member by the under plate or washer on the back of the curtain. Freedom of movement between the socket member and the stud member is maintained to accommodate the rocking, rolling or tipping motion of a car when it travels over an uneven road, and there is no appreciable friction developed under such conditions. The fastener opens easily when the curtain is stretched between fasteners. A stud member for a single curtain may be made of very much less diameter and very much shorter than in other curtain fasteners of this general type. The fastener may be opened at any angle.

The invention is not limited in use to curtains or to any particular material, but may be used upon fabric, wood, metal, or leather, or imitations thereof.

Variations in the construction and arrangement of parts other than those described are contemplated as within the principle of the invention and the scope of the following claims.

What I claim is:—

1. A socket member of a curtain fastener, having a back plate provided with a hole to receive a complemental stud member and also provided with a slot extending from said hole, a circular spring mounted on the back plate, a tongue on the back plate engaging the spring and leaving the slot in the back plate, and a locking plate encircled by the spring and having an abutment engaging the spring and provided with a hole adapted to be brought into register with the hole in the back plate, said locking plate having projections engaging the slots in the back plate whereby the locking plate is centered on the back plate, the locking plate normally blocking the hole in the back plate and automatically displaceable by the insertion of the complemental stud member and requiring positive movement for releasing the stud member.

2. A socket member of a curtain fastener, comprising a back plate provided with a hole for the reception of a complemental stud member, a locking plate slidably mounted on the back plate and having a hole adapted to register with the hole in the back plate, a spring carried by the back plate and engaging the locking plate so as to cause its hole to normally block the hole in the back plate, an oblong handle extending outwardly from the locking plate and arranged transversely thereon, and a frame connecting the back plate and locking plate, the handle being circumscribed by the frame.

3. A socket member of a curtain fastener, having a back plate provided with an eccentric hole and a slot extending from said hole, a circular spring mounted on the back plate, a tongue on the back plate engaging the spring and leaving a slot in the back plate, and a locking plate encircled by the spring and having an abutment engaging the spring and provided with an eccentric hole adapted to be brought into register with the hole in the back plate, said locking plate having projections engaging the slots in the back plate and centered thereby, the locking plate normally blocking the hole in the back plate and automatically displaceable by the insertion of the complemental stud member and requiring a positive movement for releasing the stud member.

4. A socket member of a curtain fastener, comprising a back plate provided with an eccentric hole for the reception of a complemental stud, a locking plate slidably mounted on the back plate and having a hole adapted to register with the hole in the back plate, a spring carried by the back plate and engaging the locking plate so as to cause its hole to normally block the hole in the back plate, an oblong handle extending outwardly from the locking plate and arranged transversely thereon, and a frame connecting the back plate and locking plate, the handle being circumscribed by the frame.

In testimony whereof I have hereunto set my hand this 30th day of November A. D. 1921.

EDWARD McCANN.

Witnesses:
JOSEPH Z. WILLIAM,
GEORGE H. GUENTHER.